United States Patent [19]

Culbertson

[11] 4,159,383

[45] Jun. 26, 1979

[54] N,N-DISUBSTITUTED ACRYL- AND METHACRYLAMIDES

[75] Inventor: Billy M. Culbertson, Worthington, Ohio

[73] Assignee: Sherex Chemical Company, Inc., Dublin, Ohio

[21] Appl. No.: 235,815

[22] Filed: Mar. 17, 1972

[51] Int. Cl.² .................. C07C 101/28; C07C 103/48
[52] U.S. Cl. ...................................... 560/43; 560/125; 560/172
[58] Field of Search ............. 260/482 R; 560/43, 125, 560/172

[56] References Cited

U.S. PATENT DOCUMENTS 2,749,331    6/1956    Breslow .......................... 260/482 R Primary Examiner—Paul J. Killos

[57] ABSTRACT

N,N-disubstituted acryl- and methacrylamides are disclosed wherein one of the amido nitrogen atom substituents is an n-propionate radical and the other of such substituents is a hydrocarbyl group. The disclosed compounds are useful as comonomers for the preparation of polyvinyl resinous systems in general.

12 Claims, No Drawings

N,N-DISUBSTITUTED ACRYL- AND METHACRYLAMIDES

BACKGROUND OF THE INVENTION

1. Field Of The Invention

This invention relates to novel derivatives of acryl- and methacrylamide.

2. Description Of The Prior Art

A variety of N-substituted acryl- and methacrylamides are known in the prior art. The general usefulness of these compounds as comonomers in preparing linear addition polymers is likewise widely reported. It is further recognized that the polarity of the double bond of this class of compounds is influenced by the nature of the indicated substituent or substituents, as the case may be, which in turn can affect important physical properties associated with the copolymers derived therefrom.

Accordingly, there is a continuing need for developing new types of substituted acrylamides with the objective of providing polyvinyl systems having improved physicals in terms of adhesion, dyeability, solubility and the like. Moreover, there is a special need for the type of monomers to which the instant invention is directed since these novel compounds will yield copolymers having pendant 1° carboxylate residues. Such residues can in turn be hydrolyzed to result in corresponding acid functionality or they can be readily converted to 1° isocyanate groups in accordance with the teachings of U.S. Pat. No. 3,485,806 among others. The use of the foregoing linear addition polymerization products for advantageously obtaining cross-linked compositions particularly adapted for surface coating application is of special interest.

SUMMARY OF THE INVENTION

In accordance with the present invention there is provided novel compounds having the following structural formula:

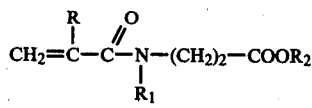

wherein R is H or $CH_3$; $R_1$ is an alkyl, alkenyl, aryl, aralkyl or cyclohydrocarbyl; and $R_2$ is alkyl.

DESCRIPTION OF THE PREFERRED EMBODIMENTS

The method contemplated for preparing the novel compounds of this invention basically involves acylating a β-substituted aminopropionate with either acrylyl chloride or methacrylyl chloride. The β-substituted aminopropionates useful for deriving the foregoing compounds are those wherein said substituent is either an alkyl, alkenyl, aryl, aralkyl or cyclohydrocarbyl radical. These aminopropionates can be readily obtained through a Michael type addition reaction whereby an acrylate or methacrylate is reacted with a primary monoamine. As indicated, the hydrocarbyl moiety of the applicable primary amines can be either alkyl, alkenyl, aryl, aralkyl or cyclohydrocarbyl. An exemplary enumeration of suitable primary amines for obtaining the Michael addition type product is, e.g., heptyl amine, lauryl amine, allyl amine, methallyl amine, phenylallyl amine, cyclohexyl amine, toluidine, β-phenylethylamine, aniline, naphthyl amine, benzyl amine and the like.

The Michael type addition reaction can be readily accomplished by combining approximately stoichiometric amounts of the amine and the acrylate. The reaction is desirably carried out in a suitable solvent, generally a polar solvent, particularly representative of which are the lower alkanols, e.g., methanol. Reaction temperature suitable for this purpose range from room temperature to about the reflux temperature of the solvent utilized. Like the acylation reaction, the Michael type addition procedure is well understood by those skilled in the art. Further details relative to these reactions, however, are embodied in the examples provided herein.

Accordingly, in order to illustrate the best mode contemplated for carrying out the present invention, as well as a manner for using the novel compounds to which the invention is directed, the following working examples are set forth. As indicated, these examples are given primarily by way of illustration and therefore any enumeration of details contained therein is not necessarily to be construed as a limitation on the invention. The only limitations intended are those expressed in the appended claims. All parts are parts by weight unless otherwise indicated.

EXAMPLE I

This example illustrates the preparation of methyl (N-allyl-N-methacrylyl)propionate.

Into a suitable reaction vessel equipped with a thermometer, stirrer and reflux condenser were charged 114 parts of allyl amine and 162 parts of methanol. To the amine solution were slowly added 175 parts of methylcrylate and the reaction mixture allowed to stir for two hours. The mixture was then held at room temperature without stirring for two days. Thereafter the methanol was removed at 50° C. under a partial vacuum. The recovered product was distilled in vacuo to provide a fraction consisting of 99.4% pure β-allyl aminopropionate having a boiling point of 37° C. at 0.03 mm Hg.

Into a suitable reaction vessel equipped as above were charged 71.6 parts of the β-allyl aminopropionate, 51 parts of triethyl amine and 175 parts of benzene. The vessel's contents were cooled to −10° C. whereupon, 57.5 parts of methacrylyl chloride were added slowly while maintaining the reaction temperature at about 10° C. Upon the addition of the acid chloride (1.5 hours) the reaction mixture was stirred overnight at room temperature. The reaction mixture was stripped on a flash evaporator to provide a crude yield in the amount of 97.3 parts. The crude product was distilled yielding 60 parts of a mid-cut fraction having a boiling point of 95° C./0.26 mm Hg. Purity of the product as determined by glc was 97.8%.

EXAMPLE II

This example illustrates the preparation of methyl 3-(N-cyclohexyl-N-methacrylyl)aminopropionate.

Into a suitable reaction vessel equipped with a thermometer, stirrer, dropping funnel and condenser were charged 290 parts of diethyl ether, 71 parts of triethylamine and 111 parts of methyl 3-cyclohexylaminopropionate. The latter ester was prepared by reacting approximately stoichiometric amounts of methyl acrylate and cyclohexyl amine following the general procedure described in Example I.

The ether solution of the ester and amine was cooled to −10° C. and 65 parts of methacrylyl chloride were added slowly while keeping the temperature below about 15° C. Stirring was continued for one hour at room temperature following the addition of the acid chloride. Filtration and subsequent evaporation of the ether afforded 140 parts (93%) yield of crude product. The crude product was distilled into middle cut, 142° C./0.2 mm, which was collected in a yield of about 100 parts. The distilled product as determined by glc was 98.2% pure. The IR spectrum of the purified product showed absorption bands at 1735, 1645 and 1620 cm$^{-1}$. The nmr spectrum integrated correctly for the expected product. Anal. calcd. for $C_{14}H_{23}NO_3$ C, 66.40; H, 9.09; N, 5.53. Found: C, 65.90; H, 9.01; N, 5.51.

EXAMPLE III

Methyl 3-(N-methacylyl-N-phenyl) amino propionate.

Following the procedure outlined in Example II, 89.9 parts of methyl 3-anilinopropionate were treated with 49.5 parts of methacylyl chloride. The distilled product, b.p. 130° C./0.06 mm, was collected in a 83% yield. The IR, nmr and elemental analyses supported the structure of the expected product.

EXAMPLE IV

Methyl 3-[N-(n-butyl)-N-methacryl] amino propionate.

Using the same procedure employed for the preparation of the compounds of Examples II and III, 79.5 parts of methyl 3-butylaminopropionate were treated with 52.7 parts of methacrylyl chloride in ether to obtain a good yield of crude product. The crude product was purified by distillation, b.p. 101°–103° C./0.04 mm, and IR, nmr and elemental analyses confirmed the structure of the expected product.

EXAMPLE V

Methyl 3-(N-acrylyl-N-cyclohexyl) amino propionate.

Methyl 3-cyclohexylaminopropionate in the amount of 92.5 parts were treated with 45.2 parts of acrylyl chloride in ether according to procedures used above. The crude material, 95 parts, was distilled, 148° C./0.2 mm, to give an 80 parts yield of purified product. IR, nmr and elemental analyses confirmed the structure of the expected product.

EXAMPLE VI

The monomer of Example II in the amount of 5 parts and 5 parts of methyacrylate were combined with 0.15 part of aziobisisobutyronitrile (AIBN) and 18 parts of benzene and heated under nitrogen atmosphere for 16 hours at 70° C. The viscous polymer solution was poured into stirred methanol to precipitate the polymer. The precipitate was collected, washed with methanol and dried to yield 7.5 parts of polymer. The isolated copolymer had an inherent viscosity of 0.32 (0.5 g/100 ml CHCl$_3$ at 25° C.) and exhibited good film forming properties. The IR spectrum of the polymer showed two carbonyl bands at 1730 (ester) and 1640 (amide) cm$^{-1}$. Elemental, differential thermal and thermogravimetric analyses also indicated the polymer to be poly(methyl methacrylate-co-methyl 3(N-cyclohexyl-N-methacrylyl)amino propionate).

EXAMPLE VII

Methyl methacrylate, 18 parts, the monomer of Example V, 4.78 parts, and 0.23 parts of AIBN were combined with 20 parts of methyl ethyl ketone and heated under nitrogen for 16 hours at 70° C. The polymer was isolated as in the previous example and dried to give a quantitative yield of copolymer having an inherent viscosity of 0.28 (0.5 g/100 ml CHCl$_3$ at 25° C.). The IR spectrum of the polymer, which was a good film former, exhibited ester and amide carbonyl bands at 1730 and 1645 cm$^{-1}$ respectively.

Nitrogen determination (Found: 1.6%; theory 1.23%), DTA and TGA studies confirmed the polymer to be poly(methyl methacrylate-co-methyl 3 (N-acrylyl-N-cyclohexyl) amino propionate).

What is claimed is:

1. A compound of the formula:

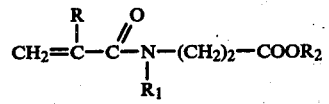

wherein R is H or CH$_3$; R$_1$ is a hydrocarbyl group; and R$_2$ is lower alkyl.

2. A compound in accordance with claim 1 wherein R is H.

3. A compound in accordance with claim 1 wherein R is CH$_3$.

4. A compound in accordance with claim 2 wherein R$_1$ is an alkyl radical.

5. A compound in accordance with claim 2 wherein R$_1$ is an allyl radical.

6. A compound in accordance with claim 2 wherein R$_1$ is a cyclohexyl radical.

7. A compound in accordance with claim 2 wherein R$_1$ is a phenyl radical.

8. A compound in accordance with claim 3 wherein R$_1$ is an alkyl radical.

9. A compound in accordance with claim 3 wherein R$_1$ is an allyl radical.

10. A compound in accordance with claim 3 wherein R$_1$ is a cyclohexyl radical.

11. A compound in accordance with claim 3 wherein R$_1$ is a phenyl radical.

12. A compound in accordance with claim 1 wherein said hydrocarbyl group is alkyl, alkenyl, aryl, aralkyl or cyclohydrocarbyl.